March 2, 1943.  P. W. NIPPERT  2,312,669
VOLTAGE REGULATOR FOR THE ELECTRICAL SYSTEMS OF AUTOMOTIVE VEHICLES
Filed Nov. 9, 1940
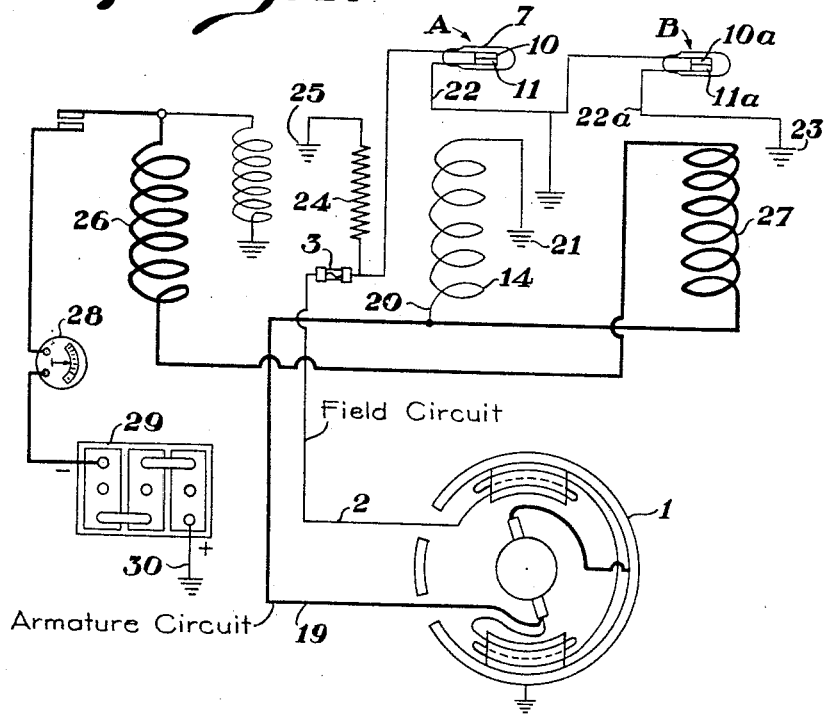
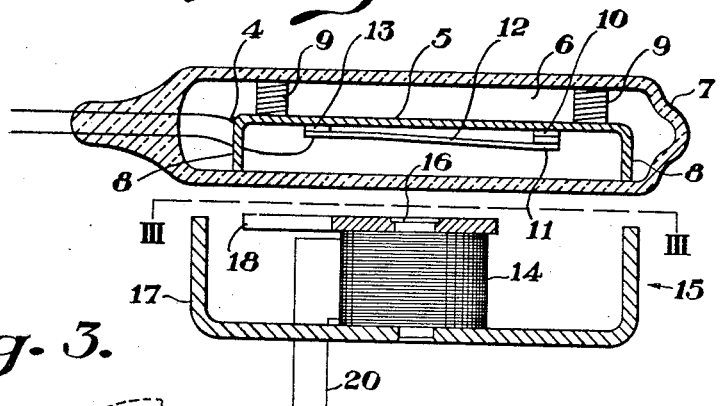
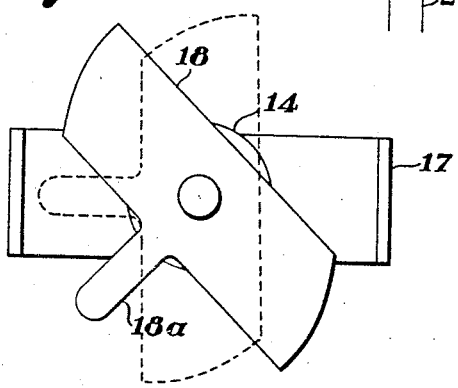
Inventor
Paul W. Nippert
Attorney Patented Mar. 2, 1943

2,312,669

UNITED STATES PATENT OFFICE 2,312,669

VOLTAGE REGULATOR FOR THE ELECTRICAL SYSTEMS OF AUTOMOTIVE VEHICLES

Paul W. Nippert, Columbus, Ohio

Application November 9, 1940, Serial No. 365,123

1 Claim. (Cl. 200—88)

This invention is concerned with automatic regulators for the electrical systems of motor vehicles, having particular reference to the circuit-interrupting switch mechanism of voltage regulators. Such regulators, as now employed on motor vehicles, comprise electromagnets or relays which, when the field windings thereof are energized, attract a movable armature to move the latter into or out of engagement with an associated contact. The movement of the armature controls the making and breaking of a circuit through relatively movable contact points, such action causing considerable sparking as the contact points are moved into and out of relative engagement. This action takes place in an ordinary atmosphere, with the result that the contact points, even though composed of resisting metals, rapidly deteriorate by an action known as "pitting" so that the device becomes inefficient or ineffective for its intended purposes.

It is therefore an object of the present invention to improve voltage or current regulators of the electromagnet or relay type by enclosing circuit completing and interrupting contacts in an hermetically sealed chamber, so that said contacts may be surrounded by an atmosphere composed of hydrogen or other suitable relatively inert gas, or in vacuua, to the end of providing for prolonged and sustained operation of said contacts and a marked increase in the effective life of the regulator.

Another object of the invention resides in placing the regulator contacts in an hermetically sealed glass tube, which may be either exhausted of air, or may contain a non-oxidizing gas, and wherein the tube, and the relatively movable contacts carried thereby, are disposed in the field of an electromagnet or relay, so that when the latter is energized, relative movement between the contacts disposed within the tube takes place for circuit regulating purposes.

A further object resides in the provision of means for regulating the intensity of a magnetic field established by the energizing of the windings of the electromagnet, so that the effect of such field on the resilient contact-carrying armature may be regulated.

For a further understanding of the invention, reference is to be had to the following description and the accompanying drawing, wherein:

Fig. 1 is a diagrammatic view of the generator and battery circuits of an automotive vehicle in which my improved voltage regulator is situated;

Fig. 2 is a vertical sectional view taken through the regulator;

Fig. 3 is a horizontal view on the line III—III of Fig. 2.

Referring more particularly to Fig. 1, there has been illustrated a conventional circuit arrangement for the electrical system of an automotive vehicle. The numeral 1 designates a generator of the two-brush type. Extending from the field winding of the generator is a conductor 2 in which is positioned a fuse, indicated at 3. The conductor 2 extends to a vibratory relay switch A and is connected as at 4 with a metallic bar 5 forming a part of the switch A, the bar being mounted within an hermetically sealed chamber 6, the latter being formed within a fused tube 7, such as glass. The ends of the bar 5 are provided with downwardly directed legs 8 which engage with the lower portion of the chamber 6, and coil springs 9 are employed to maintain this engagement, so that the bar 5 will normally occupy a definite distance from the lower wall of the tube. The use of the tube 7 constitutes an essential part of the present invention and is one of the distinguishing features thereof over prior types of voltage and current regulators.

The bar 5 has stationarily attached to its under side a fixed contact element 10, and normally disposed in engagement with this element is a movable contact element 11. The element 11 is mounted on the outer end of a resiliently movable metallic strip 12 which constitutes a relay armature. The end of the armature 12 opposed to the end receiving the contact element 11, is stationarily secured to a block of insulating material 13 carried by the under side of the bar 5. The chamber 6 may be evacuated of air, or it may contain a non-oxidizing gas such as hydrogen, nitrogen or the like, or various combinations of such properly attenuated gases which minimize spark phenomenon when relative movement takes place between normally engaging contact elements 10 and 11.

As previously explained, in ordinary voltage and current regulators, the frequent opening and closing of the electrical circuit passing through the contacts, when the latter are disposed in a normal atmosphere, result in rapid deterioration of such elements so that they lose their desired effectiveness. By the use of the tube 7, and its associated parts, such rapid deterioration is effectively concluded and the life and usefulness of the regulator indefinitely prolonged over the average life of such regulators.

The tube 7 is mounted immediately contiguous to the field winding 14 of an electromagnet or relay 15, so that said tube becomes in effect a part of said magnet or relay. The core of the winding 14 is indicated at 16 and the U-shaped frame of the relay at 17. The top of the core 16 may be provided with a metallic shunt plate 18 which is adapted to be rotated about the longitudinal axis of the core 16, so as to shield or partially shield the armature 12 from the magnetic field created by the energizing of the winding 14. When the plate or shield 18 occupies a position substantially parallel with the frame 17 and engaging the ends thereof, a maximum shielding effect is exerted thereby, but when moved to a position at right angles to the frame as disclosed in dotted lines in Fig. 3, its minimum shielding effect is obtained. By this means, the response of the armature 12 to the action of the coil 14 is rendered variable. Equivalent results, however, may be obtained by adjusting the tube 7 and the coil 14 toward and away from one another, in order to vary the width of the air gap formed therebetween, or, if desired, a variable resistance may be included in the electrical circuit in which the coil 14 is disposed, it merely being desirable that a means be provided for varying the response of the armature 12 to the electrical field created by the energizing of the coil 14. The shunt plate 18 illustrated has a laterally extending finger 18a to facilitate its adjustment.

It has been found desirable to construct the plate 18 from certain alloy material having the characteristic of carrying more flux when hot than when cold. This characteristic offsets the increase in resistance of the other iron or steel parts of the magnetic circuit when the unit becomes hot either from internal or external heat and in this manner maintains a better control of voltage or current in the complete circuit. Thus, a double control, that is, adjustment to vary the magnetic force and the effect of temperature change, will be secured.

Extending from the armature windings of the generator 1 is a conductor 19 with which is connected a shunt conductor 20. The coil 14 of the relay is disposed in series in the conductor 20, and beyond the coil 14, the conductor is grounded as at 21. A conductor 22 extends from the armature 12 disposed within the tube 7 to a stationary contact 13a forming a part of a second vibratory relay switch B positioned within a second hermetically sealed tube 7a which is identical in construction with the tube 7. A movable contact 11a normally engages the contact 10a, the former being carried by a resilient armature in the same manner as the movable contact 11. The lead 22a extends from the contact 11a and is grounded as at 23 to complete the voltage and current regulator circuits. Also joined with the conductor 2, beyond the fuse 3, is a fixed resistance 24 which is grounded as at 25.

The circuit arrangement here disclosed is a standard one and its operation is largely obvious. When the generator voltage reaches the maximum for which the unit is set, the current flow through the shunt winding in which the coil 14 is disposed, reaches such value that the armature 12 is attracted and flexed sufficiently to open the circuit established by the engagement of the contact elements, thus causing current to pass through the fixed resistance 24. This resistor is of such value that it will not pass enough current to the generator shunt field to maintain sufficient voltage in the regulator coil 14 and will therefore cause a decrease in the magnetic force acting on the armature bar 12, thus permitting the contacts 10 and 11 to close. When the contacts close the generator field circuit, the terminal voltage then rises to a predetermined value which in turn strengthens the magnetic effect of the coil 14 sufficiently to again open the contacts 10 and 11. This cycle of operation continues and produces a rapid interruption of the shunt field circuit, thus controlling or maintaining a constant voltage or current output.

As illustrated in Fig. 1, the circuit includes current regulating means having a second vibratory relay switch B and a conventional anti-flutter cutout relay 26. Beyond the point of connection of the shunt line 20 with the line 19, the latter extends to the windings 27 of an electromagnet disposed adjacent to and operative upon the relay switch B. From the coil 27, the line 19 leads to the windings of the relay 26 from which it passes to an ammeter 28 and a storage battery 29, this member being connected with the ground by a wire 30.

It will be noted that the switches A and B are connected in series so that in the event either is opened, due to an increase beyond a predetermined value of the generator output, there will be insufficient current passed to the generator shunt field and the effectiveness of the electromagnets 14 and 27 will be reduced to such an extent that the resiliency of the armature bars will overcome the magnetic force and again complete the circuits.

Through the provision of two switches A and B, both current and voltage can be regulated and the generator as well as other equipment safeguarded.

While numerous circuit arrangements may be employed, the distinguishing feature of the present invention resides in the utilization of hermetically sealed chambers for enclosing vibratory contact points whether they are employed as current or voltage regulators or both.

What is claimed is:

In a voltage regulator, a fused member forming an elongated internal hermetically sealed chamber, a support wholly contained within said chamber, a fixed contact carried by said support, a flexible arm mounted on said support, a frame positioned in fixed relation with respect to said fused member, said frame being U-shaped and having the spaced ends thereof directed toward said fused member, an electromagnet positioned on said frame between the spaced ends thereof, and a shunt plate formed from a metallic alloy with flux carrying characteristics which are directly proportional to its temperature, said plate being mounted for pivotal adjustment on said electromagnet, adjustment of said plate serving to move the ends thereof toward and away from the ends of said frame to vary the effectiveness of the magnetic field created by energizing said magnet.

PAUL W. NIPPERT.